US007966817B2

(12) United States Patent
Schenck et al.

(10) Patent No.: US 7,966,817 B2
(45) Date of Patent: Jun. 28, 2011

(54) COMPOUND TRANSMISSION

(75) Inventors: Kai Sebastian Schenck, Offenburg (DE); Wolfgang Reik, Buhl (DE); Bruno Muller, Sasbach (DE)

(73) Assignee: LuK Vermoegensverwaltungsgesellschaft mbH, Buehl (DE)

( * ) Notice: Subject to any disclaimer, the term of this patent is extended or adjusted under 35 U.S.C. 154(b) by 618 days.

(21) Appl. No.: 11/886,761

(22) PCT Filed: Mar. 24, 2006

(86) PCT No.: PCT/DE2006/000519
§ 371 (c)(1),
(2), (4) Date: Sep. 20, 2007

(87) PCT Pub. No.: WO2006/102868
PCT Pub. Date: Oct. 5, 2006

(65) Prior Publication Data
US 2009/0031725 A1    Feb. 5, 2009

(30) Foreign Application Priority Data
Mar. 26, 2005  (DE) .................. 10 2005 014 000

(51) Int. Cl.
*F02G 3/00*       (2006.01)
*F02B 37/00*      (2006.01)
*F16D 33/00*      (2006.01)
*F16D 35/00*      (2006.01)
*F16D 37/00*      (2006.01)
*F16F 15/129*     (2006.01)
*F16F 15/121*     (2006.01)
*F16F 15/123*     (2006.01)
*F16F 15/134*     (2006.01)
*F16H 57/04*      (2010.01)

(52) U.S. Cl. ........ 60/624; 192/3.29; 192/3.28; 464/68.4; 464/68.41; 464/68.3; 464/68.92; 184/6.12

(58) Field of Classification Search ............... 60/624, 60/614, 607–608, 598; 123/559.1, 561; 192/3.28–3.29, 87.11; 464/68.1, 68.3, 68.4, 464/68.41, 68.92, 51, 66.1, 64.1; 184/6.12; 267/157, 168; 74/574.3; *F16F 15/12, 15/123, F16F 15/134*
See application file for complete search history.

(56) References Cited

U.S. PATENT DOCUMENTS

| 2,197,179 | A | * | 4/1940  | Hersey ............................. 60/608 |
| 2,401,677 | A |   | 6/1946  | Yingling .................. 123/65 BA |
| 2,507,946 | A |   | 5/1950  | Waeber ........................... 60/607 |
| 2,653,591 | A | * | 9/1953  | Cole et al. ....................... 123/561 |
| 2,741,198 | A | * | 4/1956  | Attwood et al. ............... 112/220 |
| 2,880,571 | A |   | 4/1959  | Glamann |
| 3,159,987 | A | * | 12/1964 | Thompson et al. .......... 464/68.1 |
| 3,667,214 | A | * | 6/1972  | Addie ............................. 60/608 |

(Continued)

FOREIGN PATENT DOCUMENTS
CN    1374466 A    10/2002
(Continued)

*Primary Examiner* — Thai Ba Trieu
(74) *Attorney, Agent, or Firm* — Simpson & Simpson, PLLC

(57) ABSTRACT

An internal combustion engine comprises includes a turbocompound and the known Föttinger-coupling is replaced by a torsion vibration damper. The Föttinger-coupling, which is used to transmit power, has high losses in power when it is necessary to have a differential rotational speed between the input side and the output side, that is, the appearance of a slip. The losses are not used in a torsion vibration damper which has at least the same quality as a Föttinger-coupling.

17 Claims, 6 Drawing Sheets

U.S. PATENT DOCUMENTS

| | | | |
|---|---|---|---|
| 4,137,992 A * | 2/1979 | Herman | 181/213 |
| 4,445,337 A * | 5/1984 | McCreary | 60/608 |
| 4,493,674 A * | 1/1985 | Tamura et al. | 464/68.41 |
| 4,622,818 A | 11/1986 | Flaxington et al. | 60/624 |
| 4,729,225 A | 3/1988 | Bucher et al. | 60/608 |
| 4,788,884 A * | 12/1988 | Reik et al. | 464/68.3 |
| 4,953,517 A | 9/1990 | McGovern et al. | 123/559.1 |
| 5,040,433 A * | 8/1991 | Reik et al. | 464/68.3 |
| 5,062,517 A * | 11/1991 | Muchmore et al. | 192/3.29 |
| 5,080,215 A * | 1/1992 | Forster et al. | 192/3.29 |
| 5,163,875 A * | 11/1992 | Takeuchi | 464/64.1 |
| 5,323,610 A * | 6/1994 | Fransson et al. | 184/6.12 |
| 5,349,883 A * | 9/1994 | Reik et al. | 464/68.3 |
| 5,415,062 A * | 5/1995 | Kohno et al. | 464/68.5 |
| 5,526,714 A * | 6/1996 | Schierling | 464/68.4 |
| 5,681,221 A * | 10/1997 | Albers et al. | 464/67.1 |
| 6,050,094 A * | 4/2000 | Udd et al. | 60/624 |
| 6,112,869 A * | 9/2000 | Krause et al. | 192/3.29 |
| 6,131,487 A * | 10/2000 | Jackel et al. | 464/64.1 |
| 6,223,872 B1 * | 5/2001 | Heller et al. | 192/3.29 |
| 6,298,965 B1 * | 10/2001 | Krause et al. | 192/3.29 |
| 6,354,413 B2 * | 3/2002 | Heller et al. | 192/3.29 |
| 6,371,857 B1 * | 4/2002 | Kono et al. | 464/68.92 |
| 6,494,303 B1 * | 12/2002 | Reik et al. | 192/3.29 |
| 6,547,227 B1 * | 4/2003 | Mende | 267/168 |
| 6,615,962 B2 * | 9/2003 | Back et al. | 192/3.28 |
| 6,712,706 B2 * | 3/2004 | Jackel et al. | 464/68.41 |
| 6,814,194 B2 * | 11/2004 | Back et al. | 192/3.29 |
| 6,872,046 B2 * | 3/2005 | Larsson et al. | 184/6.12 |
| 6,948,603 B2 * | 9/2005 | Back et al. | 192/3.29 |
| 7,017,706 B2 * | 3/2006 | Brown et al. | 181/256 |
| 7,083,029 B2 * | 8/2006 | Seebacher et al. | 192/3.29 |
| 7,114,585 B2 * | 10/2006 | Man et al. | 180/65.21 |
| 7,287,634 B2 * | 10/2007 | Agner et al. | 192/87.11 |
| 7,297,064 B2 * | 11/2007 | Jackel et al. | 464/68.92 |
| 7,481,132 B2 * | 1/2009 | Mende et al. | 74/574.3 |
| 7,686,147 B2 * | 3/2010 | Friedmann et al. | 192/48.8 |
| 2004/0206201 A1 * | 10/2004 | Tsuruta et al. | 74/574 |
| 2009/0091070 A1 * | 4/2009 | Mueller et al. | 267/157 |

FOREIGN PATENT DOCUMENTS

| | | | |
|---|---|---|---|
| DE | 3923370 A1 | | 1/1991 |
| DE | 4427636 A1 * | | 3/1995 |
| JP | 2004278792 A * | | 10/2004 |
| WO | WO 2007065393 A1 * | | 6/2007 |

* cited by examiner

COMPOUND TRANSMISSION

CROSS REFERENCE TO RELATED APPLICATIONS

This application claims the benefit of International Application PCT/DE2006/000519, filed 24 Mar. 2006, which claims priority from German Application DE 10 2005 014 000.9, filed 26 Mar. 2005, said applications are incorporated-by-reference herein.

FIELD OF THE INVENTION

The invention relates to a compound drive in combination with a combustion engine.

BACKGROUND OF THE INVENTION

Compound drives are also called turbo-compounds. In such compound drives, the stream of exhaust gas from a combustion engine—in many cases a diesel engine—is routed through the exhaust gas turbine of a turbocharger. The charge air is fed to the combustion engine through a blower that is connected to the exhaust gas turbine with a rotationally fixed connection. As the exhaust gases continue on their way, in the existing art—in combination with a compound drive—they pass through a second turbine. This second turbine may transmit its rotational energy to a reduction gear, which is then connected in turn to a Föttinger coupling. After the Föttinger coupling there can again be a reduction gear, in order to further reduce the speed of rotation. Finally, the rotational energy is led into the crankshaft or into the centrifugal mass of the combustion engine. Through such a design, the energy content of the exhaust gases is used to increase the drive energy of the combustion engine.

Non-uniformities of rotation between the crankshaft and the turbocharger are evened out through the use of the Föttinger coupling. Otherwise a rigid power train of the composite drive would convey non-uniformities of rotation of the crankshaft all the way to the power turbine, which would lead to significant torsion vibration problems.

The design of a Föttinger coupling is very complex, which also makes this solution very costly. Furthermore, the efficiency is not optimal, due to the slippage inherent in the system.

SUMMARY OF THE INVENTION

The object of the invention is therefore to provide a composite drive which both minimizes torsion vibrations and is economical.

The problem is solved by employing a torsion vibration damper instead of a Föttinger coupling in a compound drive. A torsion vibration damper may have various designs here. In a first design, the torsion vibration damper comprises an input part and an output part, there being extensively acting energy storage devices (for example in the form of springs) situated between the input and output parts.

In a second design of the torsion vibration damper there are also an input part and an output part present, but rolling elements move on imagined ramps in both directions between the input and output parts. The input and output parts here are braced axially against each other (for example by means of a diaphragm spring).

In a Föttinger coupling, the rotational coupling from the pump side to the turbine side takes place by means of the hydrodynamic principle. That also makes it possible to eliminate torsional vibrations—at least partially. Since because of the hydrodynamic principle no rotationally fixed connection exists within the Föttinger coupling, the rotational speeds can fluctuate between the pump side and the turbine side without the transmission of torque being disrupted.

In contrast to this, in a compound drive without Föttinger coupling but having a torsion vibration damper there is always a rotationally fixed connection. However, a torsion vibration damper permits only a relatively small relative angle of rotation between the input and output parts. These angle dimensions can be a maximum of +/−90°. In other words: With a torsion vibration damper, the rotary motions of the input and output parts—aside from the superimposed vibrations—are always rotationally synchronous. With a torsion vibration damper, "overtaking" of the output part by the input part is not possible. Given these facts, it is therefore all the more surprising that a compound drive with a torsion vibration damper instead of a Föttinger coupling can be realized.

The invention will now be explained in greater detail on the basis of the figures.

DESCRIPTION OF THE PREFERRED EMBODIMENTS

Figure 1:
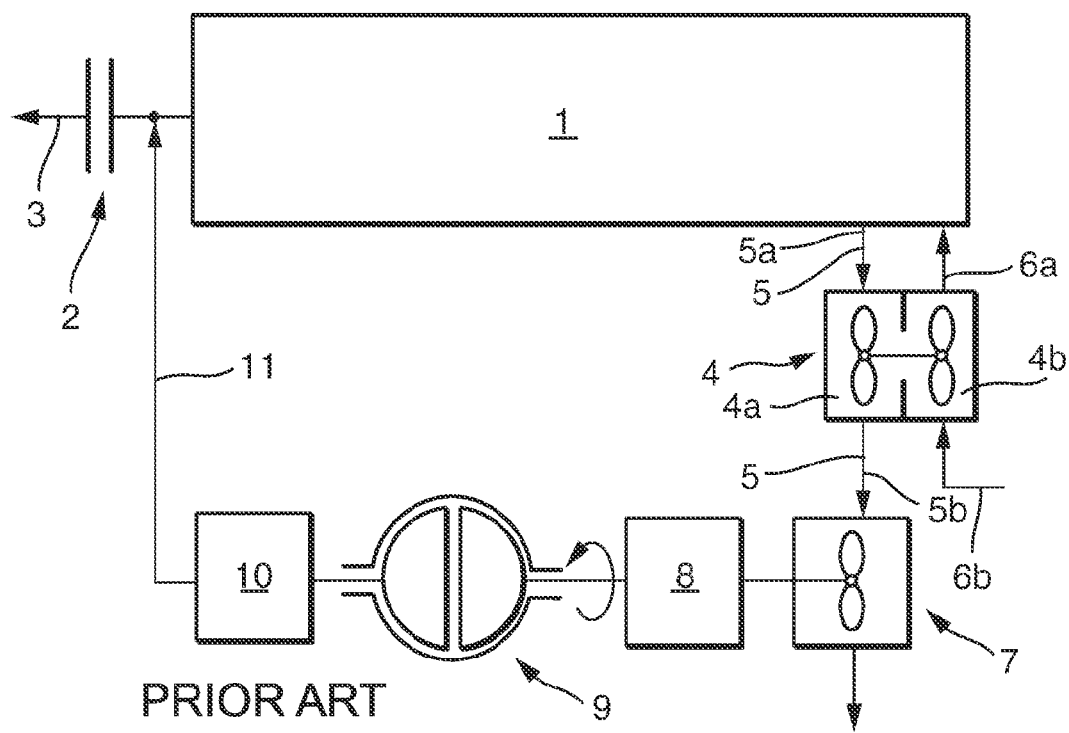
FIG. 1: A schematic depiction of the existing art.

In FIG. 1, a combustion engine 1 is connected to a turbocharger 4 through an exhaust gasoline 5a. Turbocharger 4 is subdivided into the exhaust gas turbine 4a and the charge air turbine 4b. During operation of turbocharger 4, a charge air stream 6b passes through charge air turbine 4b and becomes charge air stream 6a, which is blown into combustion engine 1.

Farther along in exhaust gas line 5 is exhaust gas line 5b, which is flow-connected to a compound drive turbine 7. A second yield is obtained here from the exhaust air, the intent here being to obtain rotational energy for the compound drive. Compound drive turbine 7 is connected to a reduction gear by a rotationally fixed connection. The intent of this reduction gear 8 is to reduce the high speed of the compound drive turbine 7 to the nominal speed of the down-line Föttinger coupling 9. The right side of Föttinger coupling 9 here is the pump, while the left half shell of the Föttinger coupling embodies the turbine. Another reduction gear 10 is connected by a rotationally fixed connection to the left side of the Föttinger coupling—i.e. the turbine. This is followed by a mechanical connection 11 of reduction gear 10 to the crankshaft or the flywheel. The crankshaft or flywheel here would represent an input point for the flow of power. The only thing that is critical here is that the input point must be on the engine side of the clutch 2. Input into a transmission input shaft 3 would make no sense, since with combustion engine 1 running it would then never be possible to bring about a non-driven condition.

Figure 2:
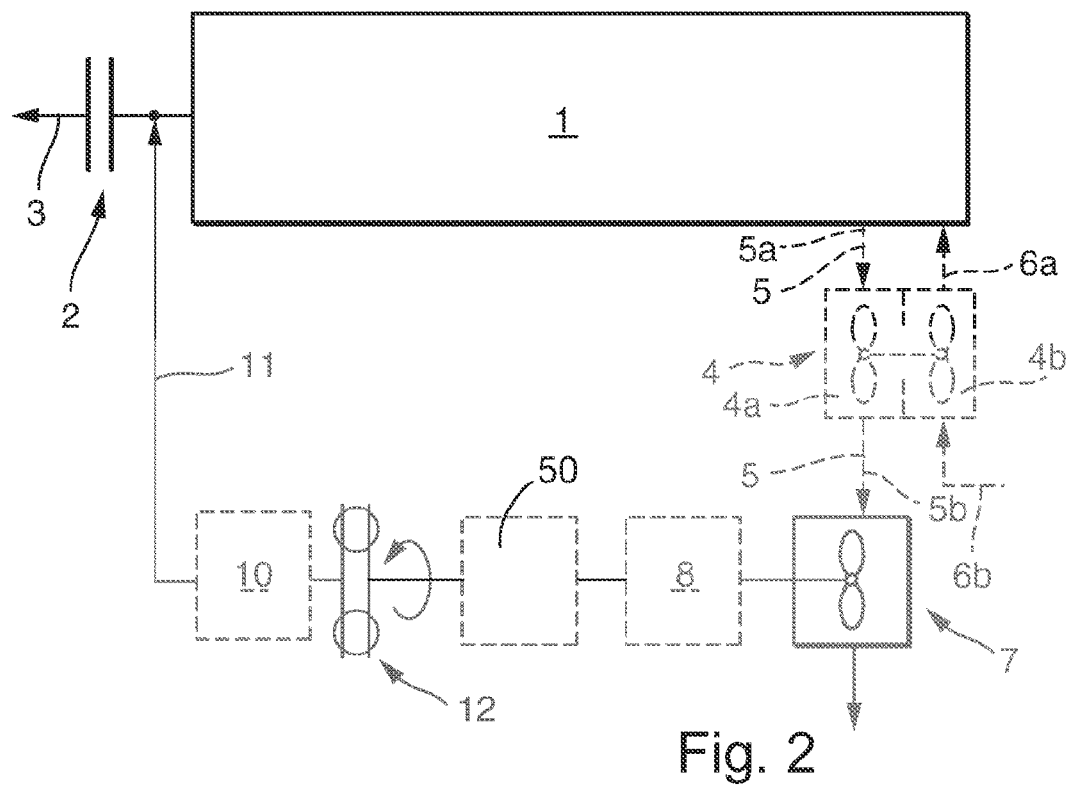
FIG. 2: a schematic depiction according to the invention.

The compound drive according to the invention can be described well by comparing FIG. 2 directly to FIG. 1, which was just described. As may be seen from FIG. 2, according to the invention the presence of a turbocharger 4 is not absolutely necessary. The only thing that is essential to the invention is that an exhaust line 5 be routed through compound drive turbine 7. An interposed turbocharger 4 would be entirely optional. The presence of two reduction gears 8 and 10 is also not absolutely necessary. Only one reduction gear 8 or 10 is important, because it is necessary to match the high speed of compound drive turbine 7 to the speed of the crankshaft. This can be done either with reduction gear 8 between compound drive turbine 7 and torsion vibration damper 12, or can also be realized between torsion vibration damper 12 and the mechanical connection 11 to the crankshaft or to the flywheel. But in another design of the invention it is also possible to employ both reduction gears 8 and 10, as is known from the existing art.

Figure 6:
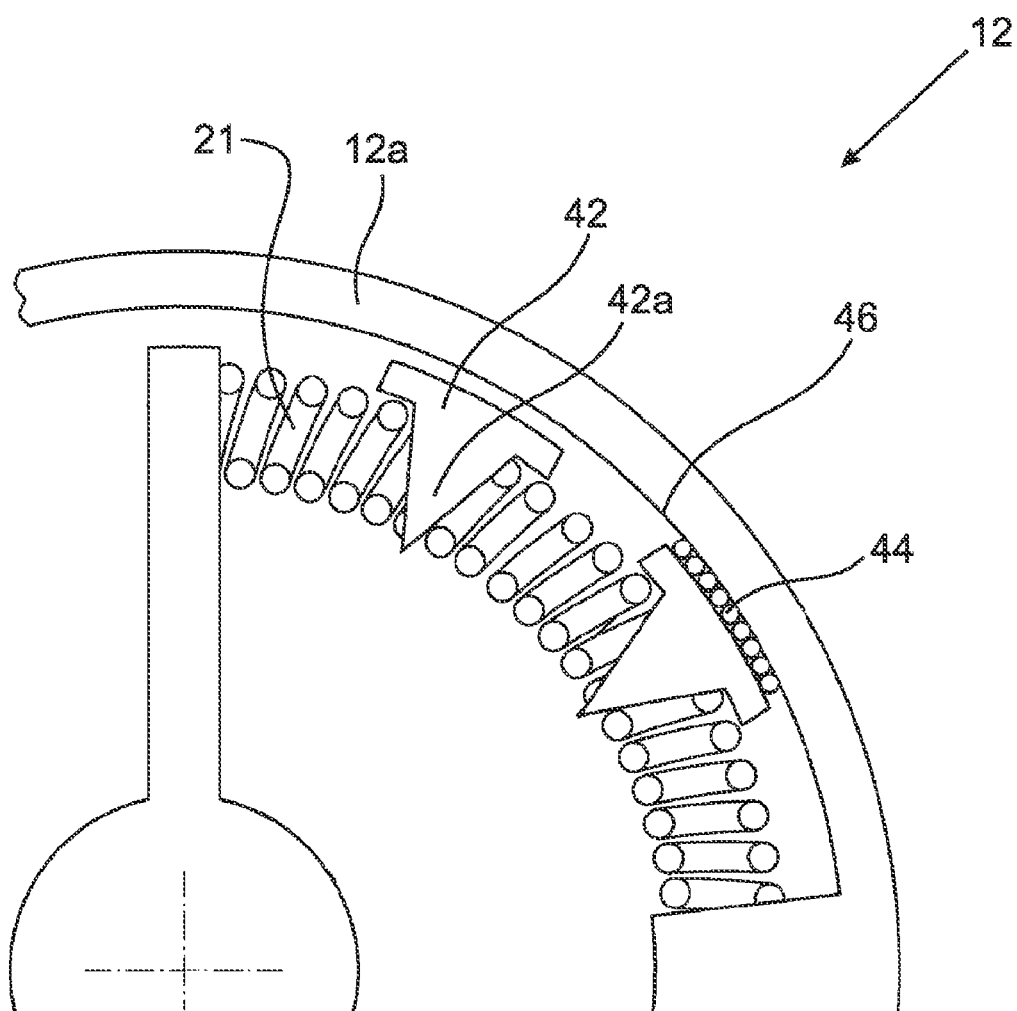
FIG. 6: a schematic view of the energy storage devices at the outermost diameter of the torsion vibration damper; and, FIG. 7: a partial schematic view of the oil lubricant system of the compound drive of the present invention connected to the oil lubrication system of the internal combustion engine.

Torsion vibration damper 12 shown schematically in FIG. 2 comprises a right-hand, disk-shaped input part and a left-hand output part, also disk-shaped. Located between the input and output parts is at least one extensively acting energy storage device, which may be in the form of a spring. In another design of the invention there is a plurality of extensively active energy storage devices present; these may be connected in parallel or in series. By designing torsion vibration damper 12 appropriately, it is possible here to influence the damping behavior and thus the frequency response curve. By designing energy storage devices having different spring characteristics, it is possible to generate overall spring characteristics that are either progressive or regressive in shape. In another design of the invention, the energy storage devices are situated at the outermost diameter of torsion vibration damper 12. Here the energy storage devices (springs) may be guided in a sliding form. FIG. 6 depicts another design of the invention the springs 40 situated at the outermost diameter 12a in which they are guided by means of sliding blocks 42; that is, the springs 40 are provided on their radial outer side with sliding blocks 42, which mesh between at least two turns of the springs 40 by means of a stop tab 42a. In another design of this idea, also seen in FIG. 6, there also rollers 44 situated between a slideway 46 located radially on the outside and the sliding blocks 42, so that the friction is reduced.

Figure 7:
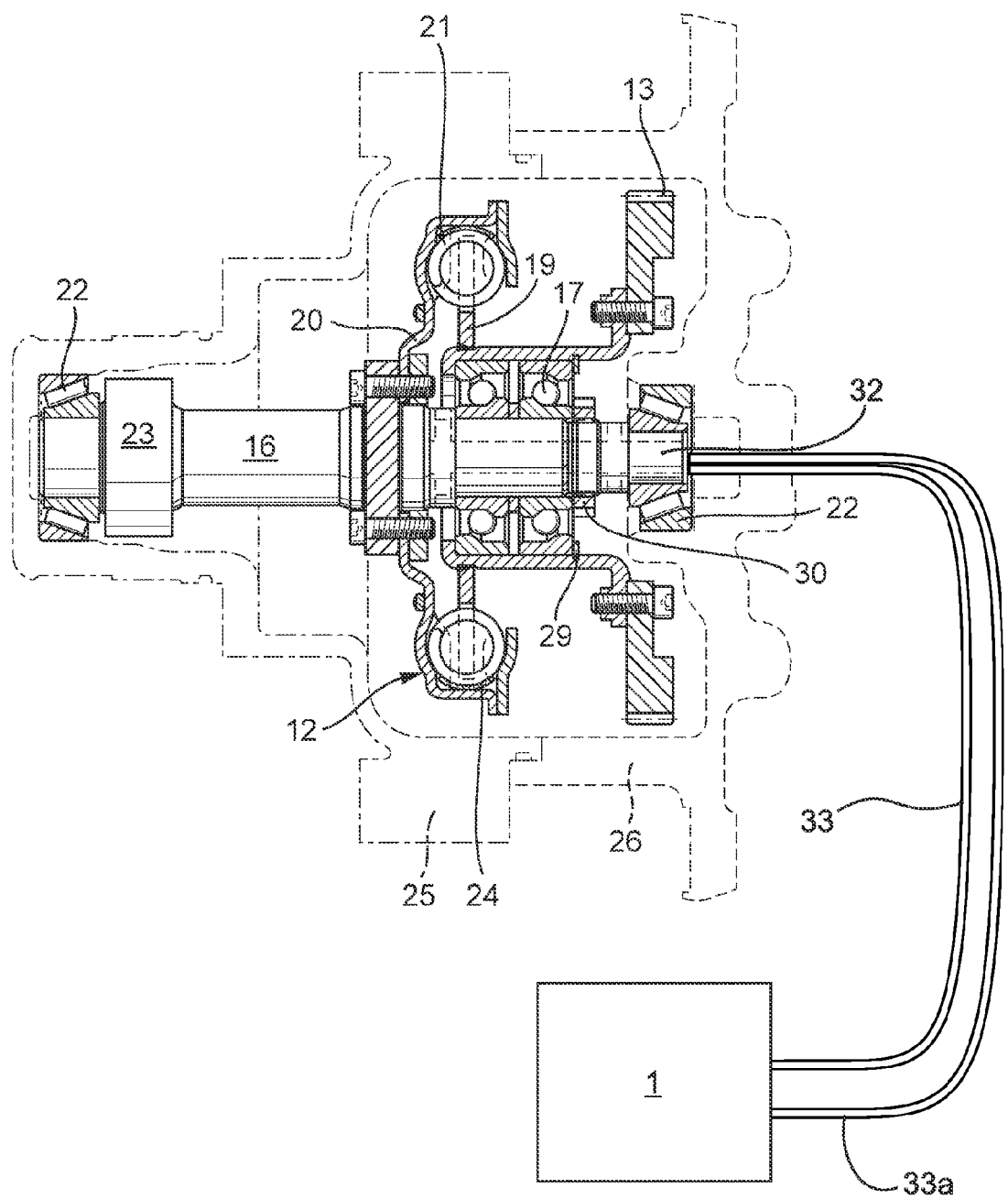

The damping behavior of a torsion vibration damper 12 can be determined, that is adjusted or tuned, in a substantial way through dimensioning of frictions within the torsion vibration damper 12. For that reason, in a first design of this invention the torsion vibration damper 12 can be provided with a lubrication of grease. In a second design the torsion vibration damper 12 is provided with a lubrication of oil; care must be taken to ensure that the oil is not thrown off. In another advantageous design of the invention, the oil lubrication can be designed as a component of the oil lubrication of combustion engine 1. FIG. 7 shows engine 1 connected to oil channel 32 of shaft 16 by oil line 33 extending from engine 1 and return line 33a extending from channel 32 to engine 1.

Figure 3:
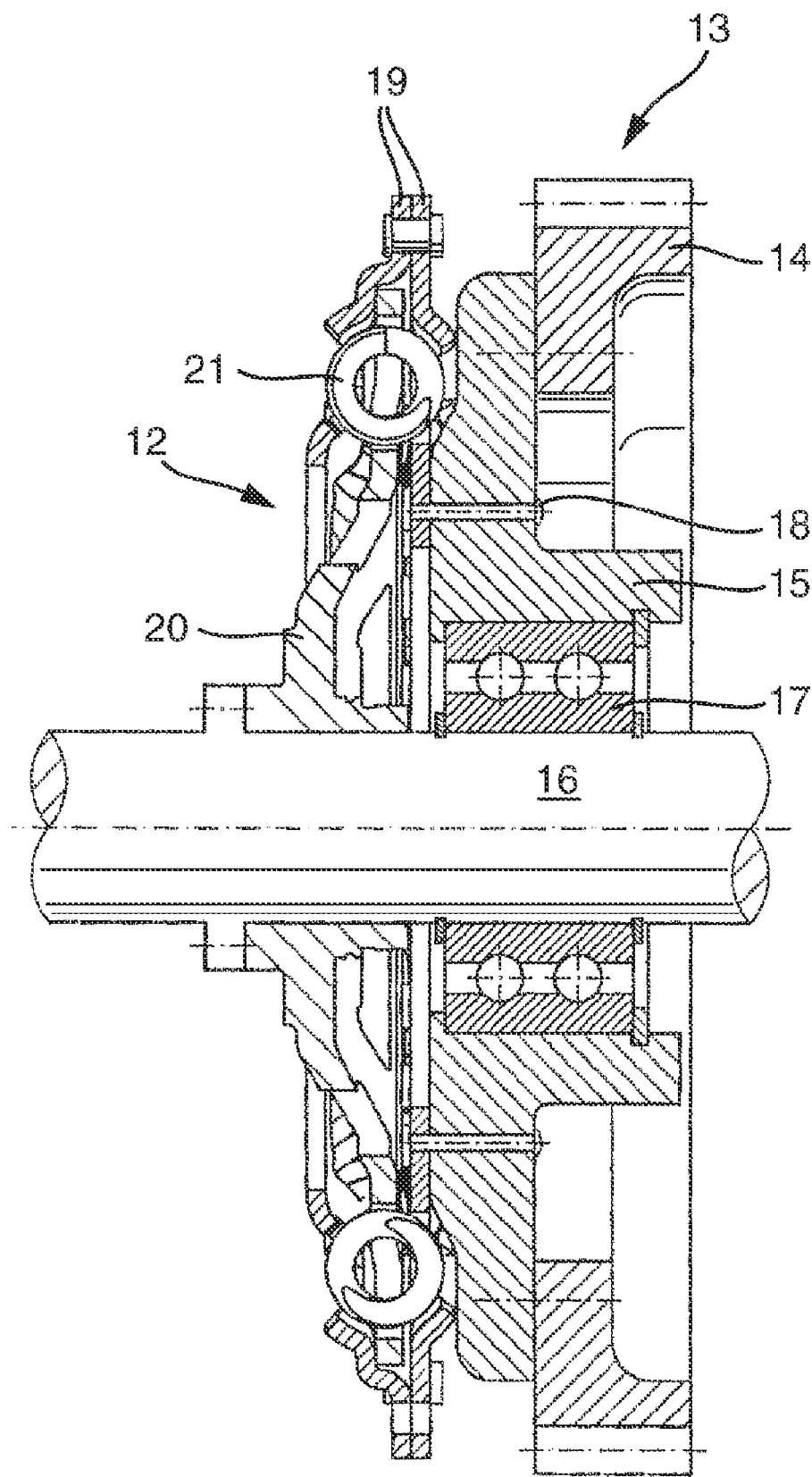
FIG. 3: a cross sectional depiction of a torsion vibration damper.

FIG. 3 reveals a torsion vibration damper 12 that is equipped with extensively active energy storage devices. In this case these energy storage devices are springs 21. Torque is introduced from compound drive turbine 7 through a gear wheel 14. Gear wheel 14 is connected by a rotationally fixed connection to an additional mass 15, which is situated on a shaft 16 by means of a bearing 17. According to the invention, gear wheel 14 and additional mass 15 may also be executed in one piece. By means of a mounting designed for example as a riveted connection 18, the flow of force into input part 19 takes place, where input part 19 comprises two disks that are riveted together. The flow of force then takes place from input part 19 to an output part 20 through the springs 21. As can be seen from FIG. 3, output part 20 touches left-hand input part 19. This is achieved by positioning a diaphragm spring between output part 20 and the right-hand input part 19. Depending on the dimensioning of this diaphragm spring, a defined friction then occurs between input part 19 and output part 20, which can dissipate part of the vibrational energy. This metered friction can also be disadvantageous, however, because with the relative rotational motions between input part 19 and output part 20 there may thus be drag torque.

In another design of the invention, the attempt is made to keep the friction between input part 19 and output part 20 as low as possible. In that case one then also speaks of so-called vibration insulation. With vibration isolation the frequency response curve appears in a very narrow band, which has the advantage that the natural frequency of torsion vibration damper 12 can be defined more clearly or tunable, and can also be designed to fall clearly outside of the operating spectrum.

In another design of the invention there is an absorber 50 located between exhaust turbine 7 and the input point on the crankshaft or flywheel. This absorber can be designed so that it vibrates in the opposite phase.

Figure 4:
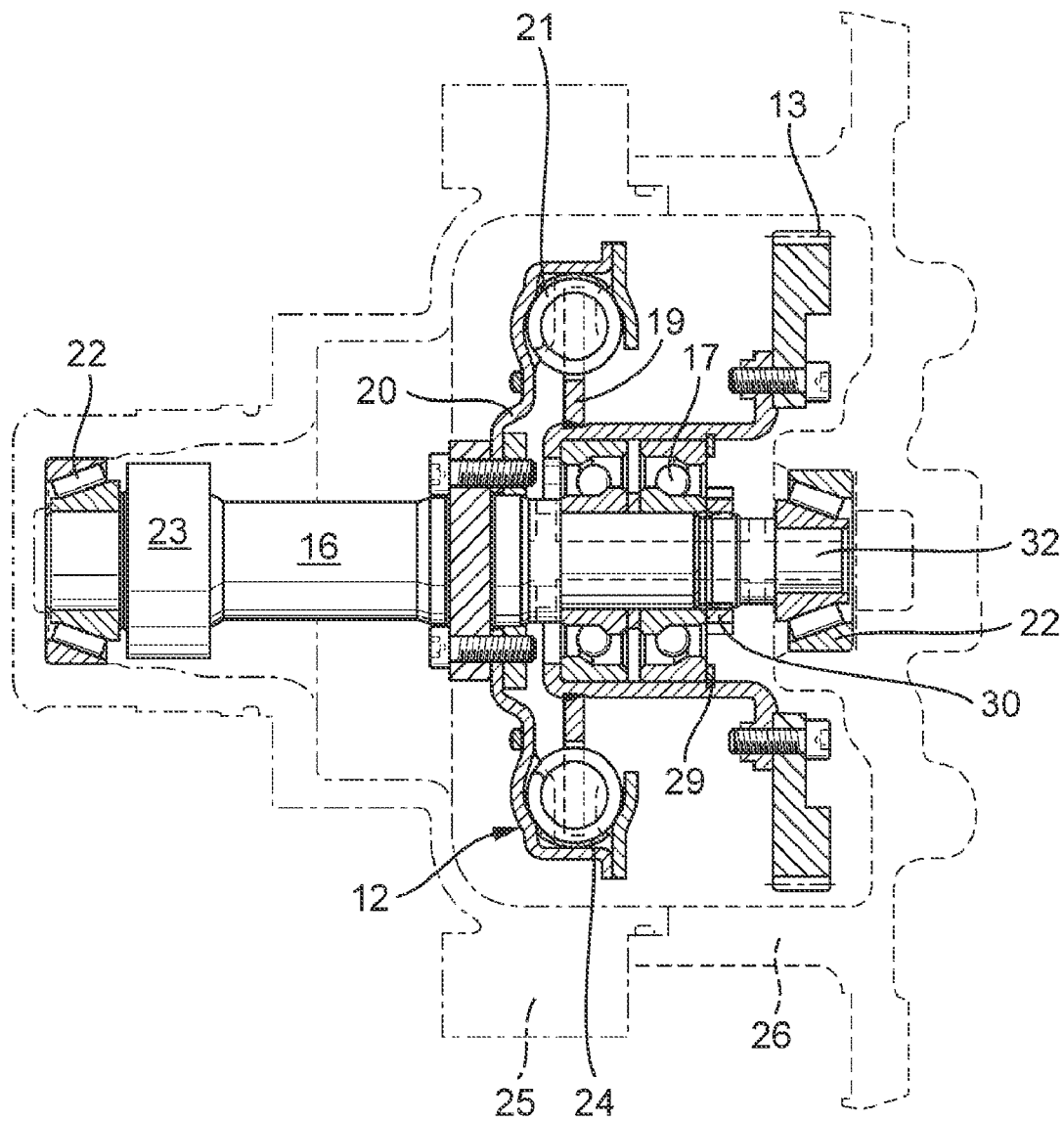
FIG. 4: a cross section through another design of a torsion vibration damper.

FIG. 4 depicts a compound drive which is situated in a housing comprising housing parts 25, 26. Shaft 16 is guided by means of roller bearings 22. The introduction of torque 13 takes place here at the larger gear wheel. A power take-off gear 23 has a smaller diameter. The explanation for this is that the speeds of rotation must be reduced from the high-speed compound drive turbine 7 to the mechanical connection 11 to the crankshaft.

As explained earlier, the flow of torque enters the compound drive through the torque input 13. Torque input 13 is connected by means of a severable connection to a sleeve which is mounted on shaft 16 by means of two roller bearings 17. Input part 19 of torsion vibration damper 12 is connected to the sleeve with a rotationally fixed connection. In the exemplary embodiment in FIG. 4, the springs 21 of torsion vibration damper 12 are guided radially on the outside by means of a sliding form 24. The output part 20 of torsion vibration damper 12 is connected in turn to shaft 16 by a rotationally fixed connection. Due to the precise positioning of both input part 19 and output part 20—both axially and radially—it is possible for torsion vibration damper 12 to work precisely.

Shaft 16 has an oil channel 32 at its right end, which is depicted with dashed lines because of its hidden position. This oil channel 32 also has two transverse channels, through which oil can be directed both to torsion vibration damper 12 and to torque input 13. The inlet for oil channel 32—not shown here—can advantageously be situated in the area of right-hand bearing 22 in right-hand housing part 26. It must also be mentioned that the angular ball bearings 17 are fixed in the sleeve or on shaft 16 by means of a lock nut 30 or retaining ring 29.

Figure 5:
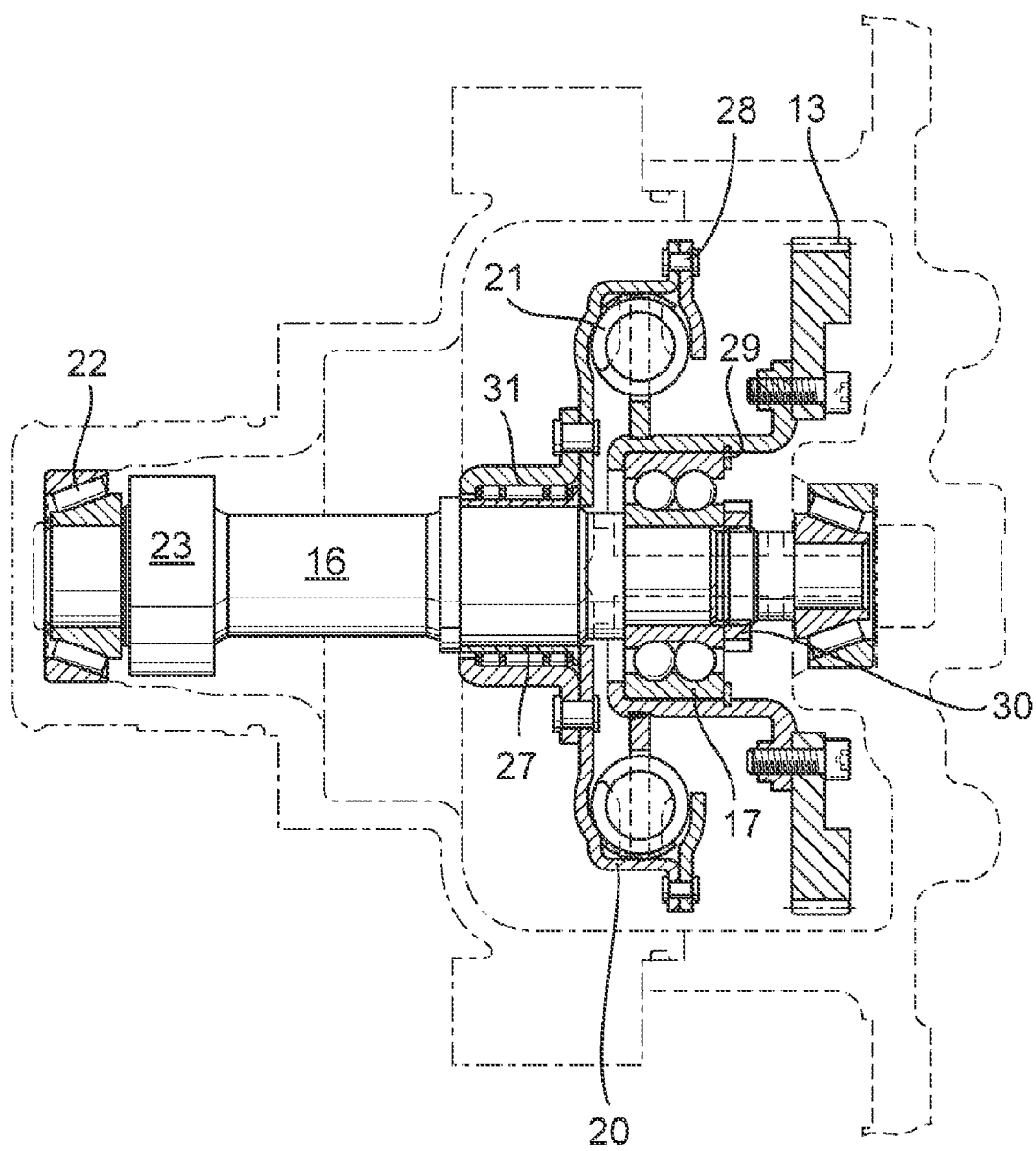
FIG. 5: a cross section through a torsion vibration damper with freewheeling.

FIG. 5 differs from FIG. 4 in that it is provided with a free wheeling mechanism 31. This free wheeling mechanism 31 is designed so that it locks when there is a flow of torque from torque input 13 to take-off gear wheel 23. In other words: When shaft 16 rotates faster than output part 20, shaft 16 can turn freely. The free-wheeling is especially effective from the perspective of energy when the engine is being started or during acceleration. In these cases the combustion engine is faster than exhaust turbine 7, because the exhaust turbine 7 needs some time before it reaches its optimal operating speed.

Since a torsion vibration damper 12 is usually operated with pulsation—that is, a basic load with undulation overlaid—in this case free wheeling mechanism 31 is not used. But if the basic load is small and the vibration amplitudes are correspondingly large, the vibrations can go beyond the zero position. In these cases the free wheeling mechanism 31 is also advantageous for the damping behavior of torsion vibration damper 12.

In the exemplary embodiment in FIG. 5, free wheeling mechanism 31 is situated between an outer sleeve and shaft 16. In this exemplary embodiment the rolling elements of free wheeling mechanism 31 do not run directly on shaft 16, however, but rather they run on an inner sleeve 27, which preferably has a hardened surface. This inner sleeve 27 is then fixed on the shaft 16 for example by means of a shrink joint.

REFERENCE LABELS 1 combustion engine (motor)
2 clutch
3 transmission input shaft
4 turbocharger
4a exhaust gas turbine
4b charge air turbine
5 exhaust line
5a exhaust line between engine and turbocharger
5b exhaust line between turbocharger and additional exhaust gas turbine (compound drive turbine)
6a charge air stream (between turbocharger and engine)
6b charge air stream (on the intake side of the turbocharger)
7 compound drive turbine
8 reduction bear (between compound drive turbine and Föttinger coupling
9 Föttinger coupling
10 reduction gear
11 mechanical connection to the crankshaft or to the flywheel
12 torsion vibration damper/vibration insulator
13 torque input of compound drive turbine
14 gear wheel
15 additional mass
16 shaft
17 roller bearing
18 riveted connection
19 input part
20 output part
21 spring
22 roller bearing of shaft 16
23 power take-off gear
24 sliding form
25 housing part
26 housing part
27 inner sleeve
28 riveted connection
29 retaining ring
30 lock nut
31 free wheeling mechanism
32 oil channel

What is claimed is:

1. A compound drive comprising in combination a combustion engine and at least one exhaust gas turbine in the exhaust gas stream and an absorber, the absorber located between said exhaust turbine and an input point, where the energy of the exhaust gas turbine in the flow of power from the combustion engine is fed into said input point, there being a speed reduction gear situated between the exhaust gas turbine and the input point, characterized in that a torsion vibration damper—having at least one input part and output part—is situated in the flow of force from the exhaust gas turbine to the input point;
   wherein said torsion vibration damper is equipped with extensively active energy storage devices;
   wherein said extensively active energy storage devices are in the form of coil springs;
   wherein said input part of said torsion vibration damper is radially outwardly positioned over the input point relative to the output part of said torsion vibration damper and,
   wherein the absorber tunes the damping behavior of the torsion vibration damper.

2. The compound drive according to claim 1, wherein a turbocharger is situated in the exhaust gas stream between the exhaust gas turbine and the combustion engine.

3. The compound drive according to claim 1 wherein an additional mass is connected to the at least one input part with a rotationally fixed connection.

4. The compound drive according to claim 1, wherein an additional mass is connected to the at least one output part with a rotationally fixed connection.

5. The compound drive according to claim 1, wherein the springs of the torsion vibration damper—at least in part—are extensively guided at their outside diameter in a sliding form.

6. The compound drive according to claim 1, wherein said springs of the torsion vibration damper—at least in part—are extensively guided at their outside diameter by sliding blocks, said sliding blocks being fixed between two turns of said springs by means of a stop tab.

7. The compound drive according to claim 6, wherein said sliding blocks are provided with rollers, said rollers being situated between said sliding blocks and an ample slideway.

8. The compound drive according to claim 1, wherein said energy storage devices having different spring characteristics are combined.

9. The compound drive according to claim 1, wherein said torsion vibration damper is equipped with an oil lubrication system.

10. The compound drive according to claim 9, wherein said oil lubrication system is coupled with an oil lubrication system of said combustion engine.

11. The compound drive according to claim 1, wherein a natural frequency of said torsion vibration damper is tunable.

12. The compound drive according to claim 1, wherein a flow of force coming from said torsion vibration damper is fed into a flywheel.

13. The compound drive according to claim 1, wherein the flow of force coming from the torsion vibration damper is fed into a crankshaft.

14. The compound drive according to claim 1, wherein said torsion vibration damper is equipped with a free wheeling mechanism.

15. The compound drive according to claim 1, wherein said torsion vibration damper is a vibration insulator.

16. The compound drive according to claim 1, wherein an absorber is situated in the power train between said exhaust gas turbine and said input point.

17. The compound drive according to claim 1, wherein said torsion vibration damper comprises at least one rotationally acting energy storage device acting on rolling elements that roll on configured slideways.

* * * * *